United States Patent Office 3,470,219
Patented Sept. 30, 1969

3,470,219
TRANSADDITION REACTION BETWEEN AN OLEFIN AND A SATURATED ALIPHATIC MONOCARBOXYLIC ACID
Charles C. Hobbs, Jr., and Alexander F. MacLean, Corpus Christi, Tex., assignors to Celanese Corporation, New York, N.Y., a corporation of Delaware
No Drawing. Filed Jan. 30, 1964, Ser. No. 341,408
Int. Cl. C11c 1/00
U.S. Cl. 260—413                 10 Claims

ABSTRACT OF THE DISCLOSURE

In effecting a transaddition reaction between an olefin and a saturated aliphatic monocarboxylic acid, which reaction is carried out in an aqueous system containing a water-soluble initiator such as a persulfate, the efficiency of the reaction is enhanced by minimizing contact of reaction products with the initiator. A preferred embodiment comprises continuously extracting the reaction products from the reaction zone, substantially as rapidly as they are formed, with a liquid extractant which is a selective solvent for the reaction product and which is substantially immiscible with the reaction medium contained in the reaction zone. Another embodiment comprises adding the initiator gradually in stages to a mixture of the reactants whereby, even at unusually high reaction temperatures, efficiency of utilization of the initiator is kept at a high level while degradation of the products by the initiator is kept at a low level.

---

This invention relates broadly to certain new and useful improvements in a chemical method. More particularly it is concerned with an improved method of effecting a transaddition reaction between an olefinic compound and a reactive organic compound which is free from ethylenic and acetylenic unsaturation. Examples of olefinic compounds that may be used in practicing the present invention are the straight-chain, terminally unsaturated olefins, (I) $\quad H-(CH_2)_nCH=CH_2$ where $n$ represents an integer from 0 to, for instance, about 24. Thus, when $n$ equals 0 the olefin is ethylene. Examples of the aforementioned reactive organic compounds are organic acids and alcohols having only single bonds between adjacent carbon atoms. The reactive organic compound is hereafter, for brevity, sometimes designated as a "saturated" organic compound or more often as a chain-transfer agent.

Transaddition reaction between an olefin, more particularly an alpha-olefin or alken-1, specifically ethylene, and a chain-transfer agent are known. In general, the reaction comprises the addition of the fragments of a chain-transfer agent on the ends of a polymer as in, for example, the known telomerization reactions. The reaction may be illustrated by the following equations wherein X—Y represents the chain-transfer agent and R· represents the initiating radical.

(II) $\quad X-Y+R\cdot \rightarrow X\cdot +RY$ (III) 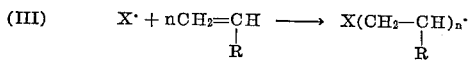

(IV) 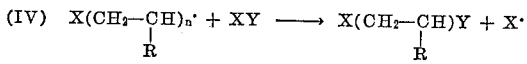

Such telomerization reactions generally have been carried out in an inert, liquid, organic reaction medium or in such a medium containing not more than about 10% by weight of water.

It has also been suggested that saturated aliphatic carboxylic acids containing from 3 to 13 carbon atoms be prepared by reacting a $C_1$ to $C_5$ saturated aliphatic carboxylic acid, specifically acetic acid, with one or more moles of ethylene in the presence of an organic peroxide catalyst, specifically di-tert.-butyl peroxide, at a pressure of 250–2500 p.s.i. and a temperature of 75°–300° C. There was no suggestion of removing the carboxylic acids thereby produced from the reaction mass as they were formed.

In a transaddition reaction between an olefin, e.g., ethylene, and a saturated aliphatic monocarboxylic acid, e.g., acetic acid, in the presence of an initiator a backbiting reaction occurs due to an intramolecular rearrangement of a reactive radical. This rearrangement may be illustrated by the following equation:

(V)
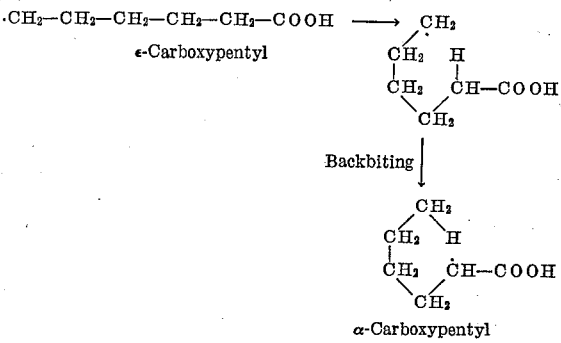

The backbiting occurs to such a large extent because the alpha-hydrogens of the epsilon-carboxypentyl radical are more reactive than the alpha-hydrogens of the acetic acid and because, since they are located in a sterically favored position, their effective "concentration" with respect to the radical end of the molecule is much higher than that of the alpha-hydrogens of the acetic acid. The initiator is not directly involved in the backbiting reaction. However, the initial non-radical products of the reaction can be attacked by the initiating radicals and lead to the formation of branched-chain products.

If the products of reaction are not removed or their concentration suppressed, the initiating radicals will attack them to produce secondary radicals and even tertiary radicals from the products of backbiting. This is illustrated by the following equations:

(VI)
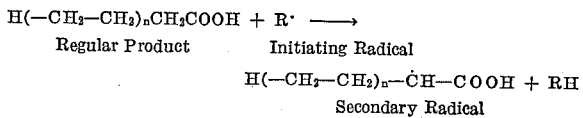

(VII)
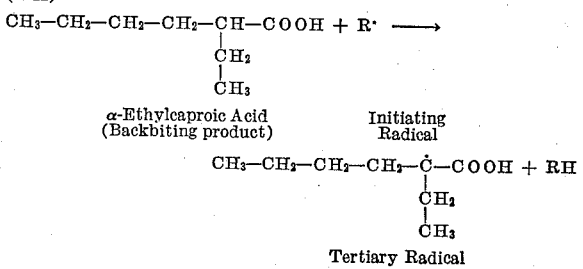

These radicals are less reactive toward the olefin, specifically ethylene, than the primary carboxyalkyl radicals which give the normal products. The tertiary radicals are almost inert under conditions that lead to rapid reaction of primary radicals. Consequently, chain-terminating reactions that involve bimolecular reactions of the secondary and tertiary radicals begin to increase so that fewer moles of normal product are made for each mole of initiator decomposed as the conversion increases.

The discovery of what occurs in a transaddition reaction between, for example, ethylene and acetic acid has led to other important and practical discoveries upon which the various embodiments of this invention are based. More particularly, it has been found that by removing the organic products of the reaction from the reaction zone, as and when they are formed, by extraction with an extractant such as an organic liquid solvent or medium for said reaction products, a higher unit weight yield of the normal product (e.g., butyric acid when the reactants are ethylene and acetic acid) is obtained per unit weight of initiator, e.g., a peroxy compound, that is decomposed during the reaction.

Among the advantages of the technique described in the preceding paragraph may be mentioned the following:

(1) By removing the organic reaction product from the reaction zone as it is formed, it does not build up to concentrations sufficient to inhibit the reaction.

(2) The organic solution can be distilled to recover the product with a smaller heat requirement than would be necessary if the entire solution had to be distilled.

It has further been discovered that, although the weight yield of butyric acid with respect to the weight of initiator decomposed is increased by the extraction process, the "abnormal" reaction leading to the production of 2-ethylcaproic acid is not suppressed. In either case, i.e., with or without use of the extraction technique, an optimum yield of either butyric or 2-ethylcaproic acid can be obtained by adjusting other conditions of the reaction. However, the efficiency of the initiator is increased by extracting the reaction products as they are formed. This was surprising and unobvious, and in no way could have been predicted.

In practicing one embodiment of this invention reaction between an olefinic compound and a chain-transfer agent is effected, at least in part, in an aqueous system (more particularly an aqueous, liquid, reaction medium) containing a water-soluble initiator of reaction between the reactants; that is, such an initiator which is at least partly soluble in water. The organic products of the reaction are extracted from the aforementioned aqueous medium, as and when they are formed in said medium, with a liquid extractant. The liquid extractant may be, for example, an inert, liquid solvent or it may be an excess over reaction proportions of the olefinic compound itself. The olefin can be used as the extraction solvent by adjusting the concentration of the aqueous phase to limit the solubility of the olefin to the desired level.

Preferably the water-soluble initiator is one which is more soluble in the aqueous, liquid reaction medium than in the liquid extractant.

Another embodiment of the instant invention involves the use of the water-soluble initiator, e.g., a peroxy compound, at higher than the usual temperature at which the initiator is commonly employed. This technique avoids the high free-radical concentrations that would be obtained by the batch addition of the initiator at such higher temperatures. The use of higher (i.e., above-normal) temperatures in utilizing a particular initiator in practicing the invention is desirable, since the chain-propagating reactions have appreciable activation energies while the chain-stopping reactions have lower activation energies. Thus, by holding the free-radical concentration at a low value, one may obtain an increase in the efficiency of the initiator by increasing the temperature at which the reaction is effected.

THE OLEFINIC COMPOUND

The olefinic reactant may be a terminally and/or internally unsaturated olefin such as the terminally and/or internally, ethylenically unsaturated hydrocarbons including, for example, ethylene, propylene, butene-1, butene-2, the higher alkene-1's including pentene-1 through octadecene-1 and higher such as those containing up to about 26 carbon atoms and the higher alkene-2's corresponding in number of carbon atoms to the aforementioned alkene-1's. Alkenes such as pentene-1, hexene-1, heptene-1 and higher members of the homologous series are especially useful in synthesizing the 1:1 adducts.

Other examples of olefinic reactants are the terminal, unconjugated diolefins, (VIII)    $CH_2=CH-(CH_2)_n-CH=CH_2$ where $n$ has the same meaning as given above with regard to Formula I. Internal olefins such as those represented by the general formula, (IX)    $R-CH=CH-R'$ where R and R' each represents a straight-chain alkyl or a nonterminally unsaturated alkenyl radical, and the olefin is unconjugated, although not as reactive, may also be used in practicing the instant invention. R and R' may be the same or different, and the alkyl or alkenyl radical which each represents may contain, for example, from 1 to about 12 carbon atoms, inclusive.

Substituted olefins, e.g., 5-hexenoic acid, $$CH_2=CH-CH_2-CH_2-CH_2-COOH$$

and higher (e.g., up to about $C_{27}$) and lower (e.g., down to $C_3$) acids of the homologous series of such straight-chain, terminally unsaturated, monocarboxylic acids may constitute the olefinic reactant. Other substituted, unconjugated, terminal olefins also may be employed, e.g., the methyl, ethyl and higher alkyl and other esters, the unsubstituted and N-substituted amides, the nitriles and other derivatives of the acids just mentioned.

Other and more specific examples of the olefinic reactant are 3-methylbutene-1, 4-methylpentene-1, 5-methylhexene-1, 6-methylheptene-1, and such olefins as those having the formulas:

$CH_2=CH-CH_2-CH=CH-CH_2-CH_3$
$C_2H_5-CH=CH-C_2H_5$
$C_9H_{19}-CH=CH-C_9H_{19}$
$C_{12}H_{25}CH=CH-CH_3$

In general, it is preferred not to use branched-chain olefins (e.g., isobutylene) that result in the formation of a tertiary intermediate radical with the accompanying disadvantages mentioned hereinbefore.

Mixtures of different olefinic reactants in any proportions may be employed in order to obtain a mixture of products having properties best adapted for a particular end-use.

THE CHAIN-TRANSFER AGENT

Illustrative examples of saturated organic compounds or chain-transfer agents that may be used in practicing the present invention are the organic acids and alcohols, more particularly the water-soluble organic acids and alcohols, that are free from ethylenic and acetylenic unsaturation. Advantageously organic acids, if employed, are those which contain at least two carbon atoms in the molecule. Formic acid is usable but has a low chain-transfer efficiency, which results in a low initiator efficiency. For instance, the organic acid may be a saturated aliphatic, straight- or branched-chain, monocarboxylic acid that is at least partly soluble in water, one represented by the general formula R—COOH where R represents an alkyl radical containing from 1 to 20 carbon atoms or more and having the aforementioned solubility characteristics. The organic acid also may be halogenated or otherwise substituted; for instance, a dichlorinated or difluorinated alkanoic acid such as dichloro- and difluoroacetic acids may be employed. The alpha,alpha-dimethyl, -diethyl and higher -dialkylacetic acids also may be used, these acids being embraced by the aforementioned formula R—COOH. Preferably R in this formula represents methyl, ethyl or an isobutyl radical. Organic acids other than HCOOH should have at least one α-hydrogen atom.

The various hydroxy alkanoic acids such as glycolic acid, and the various hydroxylated propionic, butyric, valeric and higher alkanoic acids are examples of other useful chain-transfer agents.

The use of polyfunctional acids such as polycarboxylic acids is not precluded but cause the reaction to be more complex, i.e., less "clean cut."

Isobutyric acid is particularly valuable as a chain-transfer agent since it leads to the production of a series of neoacids that can be used in the production of, for example, high-temperature lubricants. The preparation of such neoacids is illustrated by the following equation:

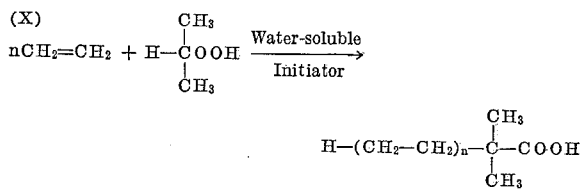

Illustrative examples of alcohols that may be employed as the chain-transfer agent are the monohydric alcohols including the saturated aliphatic, straight- or branched-chain, monohydric alcohols that are at least partly soluble in water. For instance, the alcohol may be one represented by the formula R—OH where R represents an alkyl radical of any chain length so long as the alcohol is at least partly soluble in water, e.g., one containing from 1 to 8 carbon atoms, inclusive.

Methanol as the chain-transfer agent provides means for the production of straight-chain, odd-carbon, primary alcohols. Heptanol-1 produced in this way could be converted to heptanoic acid. Using isopropyl alcohol as a reactant provides means for a series of 1,1-dimethyl-alkanols. In preparing such transaddition products from isopropyl alcohol, acetyl peroxide was used as the initiator. This was contrary to the teachings of the prior art which indicates that it could not be done (see, for example, W. H. Urry et al., J. Am. Chem. Soc., 76, 450 (1954)). Other alcohols useful as reactants (chain-transfer agents) will be apparent to those skilled in the art from the foregoing illustrative examples.

Examples of other classes and species of chain-transfer agents that may be employed in carrying the present invention into effect are esters of monohydric alcohols such as esters of the alcohols mentioned hereinbefore by way of example; nitriles, e.g., acetonitrile; acetals, e.g., methylal; and cyclic ethers, e.g., trioxane. Isopropyl acetate functions in the expected manner but has a much lower chain-transfer constant than isopropyl alcohol. Methyl formate, which hydrolyzes in an aqueous system, gives largely the expected series of products in a nonaqueous system but also undergoes a chain-decomposition reaction that leads to the loss of methyl formate. Methylal seems to give a complicated group of products. Trioxane appears to have a very low chain-transfer coefficient. The use of halogenated hydrocarbons as chain-transfer agents is not precluded, especially those which are relatively stable toward hydrolysis. The available anhydrides of water-soluble organic acids such as those mentioned hereinbefore by way of example may be employed as chain-transfer agents.

Preferred chain-transfer agents include acetic acid, propionic acid, isobutyric acid, methanol, isopropyl alcohol and other water-soluble alcohols.

THE WATER-SOLUBLE INITIATOR

Illustrative examples of water-soluble initiators that may be used are the water-soluble peroxy (peroxygen) compounds, e.g., hydrogen peroxide, and the water-soluble persulfates, perborates and perphosphates. More specific examples are the ammonium and alkali-metal (sodium, potassium, etc.) persulfates, perborates and perphosphates, and the corresponding peracids. Another class of persalts comprises the water-soluble percarbonates. Various other examples of water-soluble peracids and persalts and of other water-soluble initiators will be apparent to those skilled in the art from the foregoing illustrative examples.

In general, the initiator should be one which is more soluble in the aqueous phase than in the organic phase. The persulfates are very satisfactory for this purpose. The persulfate ion decomposes at a fairly high rate at 80° C. Hence, if the system is to be used at a higher temperature, the initiator advantageously is introduced slowly (e.g., by adding it in increments or by slowly pumping a solution of the same) into the reaction zone during the course of the reaction. Thus, the present invention provides an improvement in a method wherein a free-radical initiator, more particularly a water-soluble, free-radical initiator, is added to a reaction mixture comprising an olefin, more particularly a straight-chain or linear, terminally unsaturated and/or internally unsaturated olefin, and a reactive organic compound which is free from ethylenic and acetylenic unsaturation. This improvement, whereby new and unobvious results are obtained, consists in adding a small or minor amount (e.g., about 1% to about 20% or more but less than 50%) of the aforesaid initiator to the reaction mixture at the start of the reaction. The remaining larger amount of initiator is added gradually, i.e., either continuously or in small increments, throughout the course of the reaction. Surprisingly and unobviously this technique permits an increase in the reaction temperature at which the particular initiator can be used most effectively. The use of the higher temperature, in turn, results in an increase in the efficiency ratio of the initiator. (The term "efficiency ratio" is defined as the number of moles of olefin, e.g., ethylene, consumed per mole of initiator decomposed.)

THE LIQUID EXTRACTANT

Illustrative examples of the liquid extractant are liquid hydrocarbons, more particularly the straight-chain alkanes, e.g., the normal forms of hexane, heptane, octane, nonane, decane, dodecane and higher members of the homologous series of normal alkanes. Preferably extractants with tertiary-hydrogen atoms are not used, e.g., alkanes with a single branch. Doubly-branched alkanes (i.e., those with quaternary carbon atoms) would not be undesirable. Other examples of useful extractants are the various alkyl ethers wherein the alkyl groups are free from a tertiary-hydrogen atom, e.g., di-n-propyl ether, di-n-butyl ether, di-n-amyl ether, methyl n-butyl ether, ethyl n-propyl ether, propyl n-butyl ether, methyl n-hexyl ether and the like.

The use of extractants having an aromatic nucleus or an aromatic substituent is not precluded, but such extractants have certain drawbacks that render them less attractive for use. Thus, the use of extractants containing singly substituted aromatic rings would lead to some radical loss by addition of radicals to the aromatic system; and extractants comprising an aromatic nucleus with simple alkyl side chains would have readily abstratable hydrogen atoms, thereby rendering the reaction more complex.

Excess olefinic reactant itself may constitute the extracting agent. In the case of the higher-molecular-weight olefins, a certain low concentration of olefin, e.g., about 0.5–1.5%, specifically about 1%, is required in the aqueous phase. This can be maintained, for example, by adjusting the concentration of the chain-transfer agent, e.g., acetic acid, until the amount of olefinic reactant required for reaction with the chain-transfer agent saturates the aqueous phase. Any additional olefin then forms a separate phase and can be used as the extraction agent and, at the same time, keeps the aqueous phase saturated with the olefin.

From the foregoing it will be seen that the liquid extractant may be either the olefinic reactant itself or an inert (substantially completely inert), volatile (volatilizable), liquid solvent such as the straight-chain hydrocarbon solvents, specifically the normal alkanes. By "inert" or "substantially completely inert" liquid solvent, medium or extractant is meant one which, under the reaction conditions, is so inert or non-reactive toward the reactants and the reaction products that it will not materially affect the desired course of the reaction or the desired constitution of the reaction products. By "liquid solvent," or "liquid medium," and similar wording herein is meant a solvent or medium which is liquid at the temperature and pressure employed in effecting the reaction. In other words the inert, liquid solvent or medium employed as an extractant may or may not be liquid at room temperature (20°–30° C.) or at any other temperature below the reaction temperature.

The only limitations on the boiling point of the liquid extractant are those related to its separation, e.g., by distillation, from the reaction products and the practical necessity of minimizing solvent losses by evaporation. Thus, one may use a liquid extractant boiling below 100° C. or with a boiling point or range above 200° C. or even above 300° C. or higher as desired or as conditions may require. Ordinarily, the use of a fairly low-boiling extractant is advantageous.

MODIFIERS

Various modifiers or additives are optional ingredients that may be included in the reaction mixture along with the other ingredients. Such additives include, for example, buffering agents, neutralizing agents, dehydrating agents, activators of the free-radical initiator, catalysts or regulators that accelerate the transaddition reaction or control its course, and others. Examples of ions that may be introduced into the reaction mixture to activate the initiator or to catalyze the reaction are $Ag^+$, $Cu^{++}$, $Co^{++}$, $Ni^{++}$, $Hg^{++}$, $Ce^{+++}$, $Ce^{++++}$ and $Cr^{+++}$. Such ions may be introduced by the addition of such salts as, for instance, silver acetate, cupric acetate, cobaltous acetate, nickelous acetate, cerrous carbonate, cerric sulfate and chromic acetate plus water. Other varivalent ions also may be incorporated in the reaction mixture. The amount of such activator or catalyst, if employed, may range from a trace up to, for instance, 10 mole percent of the molar amount of the other active reactants employed. The use of larger molar amounts is not precluded.

Alkaline agents such as alkali-metal salts of monocarboxylic acids, e.g., sodium or potassium acetate may be added to neutralize the acidity of the bisulfate produced from an initiator such as sodium or potassium persulfate.

When certain embodiments of the present invention involve carrying out the reaction under substantially anhydrous conditions, it may be desirable to add a dehydrating agent to the reaction mixture. Although any dehydrating agent that will not materially affect the desired course of the reaction may be used, it is advantageous to use an organic anhydride wherein the organic grouping is the same or similar to that of the chain-transfer agent. For example, acetic anhydride is a particularly useful dehydrating agent when the chain-transfer agent is acetic acid.

REACTION CONDITIONS

Temperature of reaction

The temperature of the reaction may range, for example, between ambient temperature (about 20°–30° C.) and about 100° C. at atmospheric pressure. Under superatmospheric pressures higher temperatures can be employed, e.g., temperatures of the order of 200° C. or even 250° C. or higher depending, for instance, upon the particular olefinic reactant and chain-transfer agent employed, the particular initiator used, the particular products desired, and other influencing factors.

Pressure of reaction

Since the reaction is effected in the liquid phase, any pressure that will maintain the reaction mass in the liquid phase during the course of the reaction at a particular temperature can be used. Thus, atmospheric or superatmospheric pressures may be used depending upon the vapor pressure of the particular reactants, the particular temperature at which the reaction is effected and other influencing factors. Thus with normally gaseous olefins, the reaction pressure may range, for example, from 0 p.s.i.g. to about 5000 p.s.i.g. or even higher as desired or as conditions may require. Subatmospheric pressures alone or in combination with operations under atmospheric and/or superatmospheric pressures may be used where such reduced pressures may be desirable as, for instance, for regulating the concentration of a gaseous olefin, e.g., ethylene, in the liquid phase at very low levels.

Time of reaction

The time of reaction will vary widely depending upon the particular olefin, chain-transfer agent and initiator employed, the temperature of reaction, the mode of operation (continuous, semicontinuous or batch), type of equipment used, and other influencing factors. It is usually desirable to allow sufficient residence time in a batch reaction for about five half lives of an initiator such as a peroxide to elapse. This may take, for example, from 24 hours to 5 minutes (or even 1 minute) depending upon the particular temperature used. (The peroxide concentration is controlled along with the temperature in order to obtain the desired free-radical concentration.) The reaction periods may be similar using a non-backmixing continuous reactor, but may be longer (e.g., 48 hours or more) using a back-mixing continuous reactor. In continuous operations the residence time in the reactor in order to obtain optimum results is usually different for each of the two phases, that is, for the aqueous and organic phases. Since the reaction probably occurs mainly in the aqueous phase, this is the important one to control.

Proportions of ingredients

The concentration of the chain-transfer agent can be varied within rather wide limits, but advantageously is as high as possible, e.g., from about 50% to 75% or more by weight of the total amount of water and chain-transfer agent.

The concentration of water-soluble initiator in the solution or system of water and chain-transfer agent is usually within the range of 0.001 M to 0.1 M. As the concentration is increased, the efficiency of the initiator ordinarily is decreased. Lower concentrations (i.e., the lower limits of the range), although beneficial from the standpoint of the efficiency of the initiator, result in reduced production rates. When using a persulfate initiator and, more particularly, an alkali-metal persulfate in an aqueous solution of acetic acid as the chain-transfer agent, the concentration of said initiator in the aqueous acetic acid system advantageously is from about 0.005 M to about 0.02 M, specifically about 0.015 M.

In general, only enough water is employed to solubilize the amount of initiator used, to phase out the extraction agent and to give a desirable distribution coefficient for the products between the phases. From a practical standpoint this ordinarily requires that a compromise be reached among these factors. However, in most cases the water concentration does not exceed about 50% by weight of the aqueous phase.

The olefinic reactant and the chain-transfer agent may be used in equal molar ratios; or, depending upon the particular extractant and reactants employed and other influencing factors, with either of the reactants in excess of the other. Thus when the liquid extractant is other than the olefin itself, the chain-transfer agent is generally employed in the reaction phase in excess of equal molar proportions, e.g., in a molar ratio of from about 10 or 15 (preferably at least about 100) to 500 or more moles of chain-transfer agent per mole of olefin. Obviously no more chain-transfer agent should be used in the reaction phase than that required to effect the desired reaction at maximum efficiency with lowest unit cost. When the excess or unreacted olefin itself constitutes the liquid extractant, then the molar amount of olefin in the extraction phase may be in excess of equal molar proportions with respect to the chain-transfer agent, e.g., in the ratio of from about 1.05 to 500 or more moles of the olefin per mole of the chain-transfer agent. In this connection see, also, the third paragraph under the heading "The Liquid Extractant," supra, wherein the use of excess olefinic reactant as the liquid extractant was briefly discussed.

In order that those skilled in the art may better understand how the present invention can be carried into effect, the following examples are given by way of illustration and not by way of limitation.

The data and results of Examples 1 through 4 are summarized in Table I.

TABLE I

| Example Nos. | 1 | 2 | 3 | 4 |
|---|---|---|---|---|
| Ml. aqueous HOAc (a) | 150 | 150 | 150 | 150 |
| Wt. Percent HOAc in aqueous HOAc | 50 | 50 | 50 | 10 |
| Organic extractant, specifically n-decane, ml | 30 | 30 | 30 | 30 |
| NaOAc,[b] milliequivalents | 7 | 7 | 7 | 7 |
| $Na_2S_2O_8$, millimoles | 3 | 3 | 3 | 3 |
| Temperature, °C | 80 | 80 | 80 | 80 |
| Ethylene pressure, p.s.i.g | 30 | 100 | 400 | 100 |
| Product, millimoles: | | | | |
| Butyric acid | 9.65 | 3.60 | 1.30 | 0.0074 |
| 2-ethylbutyric acid | 0.0335 | 0.00364 | 0.00582 | 0.00186 |
| Caproic acid | 9.0215 | 0.0584 | 0.0400 | 0.00434 |
| 2-ethylcaproic acid | 0.221 | 0.674 | 0.297 | 0.116 |
| Caprylic acid | | 0.0436 | 0.0859 | |
| 2-butylcaproic acid | | 0.225 | 0.258 | 0.0279 |
| Capric acid | | 0.097 | 0.137 | |
| Lauric acid | | 0.069 | 0.071 | |
| Residue, g | 9.021 | 0.326 | 0.840 | 0.052 |
| Efficiency ratio [c] | 3.7 | 6.0 | 10.3 | 0.72 |
| Ethylene going to volatile products, percent | 94 | 43 | 15 | |

[a] HOAc=Acetic acid.
[b] NaOAc=Sodium acetate, the function of which is to neutralize the sodium bisulfate produced from the sodium persulfate initiator.
[c] Efficiency ratio is defined as the number of moles of ethylene consumed per mole of initiator decomposed. In these runs it is based on the assumption that the nonvolatile residue has an average molecular weight of 500.

In carrying out the runs of Examples 1 through 4, 150 ml. of aqueous acetic acid of the strengths stated and containing 7 milliequivalents of sodium acetate was charged to a 250 ml. Magne Dash reactor together with 30 ml. of n-decane. The air in the reactor was purged by flushing with ethylene. The system was then heated to the desired temperature (80° C.) and pressured to the desired level with ethylene. When everything was operating at a steady level or state (i.e., the pressure was maintained at a steady level and the temperature was maintained at a steady 80° C., neither rising nor falling significantly), 3 millimoles of $Na_2S_2O_8$ in 15 ml. of aqueous solution was pumped into the reactor. The reaction conditions were maintained for 2½ to 3 hours.

The reaction mass separated into an aqueous phase and an organic phase upon discontinuation of stirring. Analyses were made by gas chromatography of both the aqueous and organic (mainly n-decane) phases. The distribution coefficient for butyric acid between 50 wt. percent HOAc-50 wt. percent $H_2O$ and n-decane was about 0.15. (The distribution coefficient is the ratio of concentrations of a component in two phases when equilibrium has been established with respect to that component.) All the other components were transferred substantially completely to the n-decane layer.

Examples 1 through 4 show that butyric acid production falls off rapidly as ethylene pressure is increased. This is also generally true with repect to the production of 2-ethylbutyric acid, the yield of which is of the order of 1/300 the amount of butyric acid formed. This indicates that 2-ethylbutyric acid is a product of secondary attack on butyric acid.

The caproic and 2-ethylcaproic acids have distribution curves that are similar to each other. The continually increasing production of 2-butylcaproic acid with increasing ethylene pressure indicates that the 2-ethylcaproic acid precursor radical is further converted to the 2-butylcaproic acid precursor radical to a greater extent as the ethylene pressure is increased. The 2-butylcaproic acid precursor radical can give the expected acid by chain transfer or it can undergo a backbiting reaction. In view of the ratio of 2-ethylcaproic acid to caproic acid the backbiting reaction is probably heavily favored, even more so since the hydrogen atom involved is tertiary. The resulting radical (a teritary one) is relatively non-reactive toward ethylene, especially at pressures below about 200 p.s.i.g., so most of it probably goes into chain-termination products.

The distribution of caprylic, capric and lauric acids indicates that these components are still increasing with pressure in a regular manner. Of the higher-molecular-weight products obtained, the straight-chain acids predominate.

The compositions of the residues could not be determined with certainty. They are white, low-melting, waxy solids, the infrared spectra of which resemble long-chain carboxylic acids. It would be expected that these residues would contain the chain-stopping products, and that these would be mainly branched-chained compounds (probably substituted succinic anhydrides). Some infrared evidence was found in support of these views.

Example 4 shows the effect of lowering the concentration of acetic acid in the aqueous phase. Although the most-favored product was 2-ethylcaproic acid, as was desired, the efficiency ratio was much lower than usual. One anomaly appearing in the results of Example 4 is that the ratio of 2-ethylbutyric acid to butyric acid is much higher than usual. The reasons for this are not understood, although the reduced availability of acetic acid for chain transfer may be involved. Such reduced acetic-acid availability would increase the relative attack on the butyric acid product.

Referring to Table I it will be noted that there is a steady increase in the efficiency ratio of the initiator with increasing ethylene pressure. Note Examples 1, 2 and 3 wherein the respective efficiency ratios were 3.7, 6.0 and 10.3 at ethylene pressures of 30, 100 and 400 p.s.i.g., respectively. This is due to the fact that any attack on the initial products did not cause any serious chain-stopping reactions. (Parenthetically it may be noted that the initially relatively low value of the efficiency ratio is probably due to the use of stainless-steel equipment in carrying out the reaction. Stainless steel is known to exert a retarding effect on the ethylene reaction in an acetic-acid system using acetyl peroxide as the initiator. The inhibiting effect when using a persulfate initiator may be even greater.)

In marked contrast the general trend in the efficiency ratios of the initiator is downward with increasing pressure when the reaction products are not extracted as and when they are formed. This indicates that the initial reaction products are reacting further in chain-stopping reactions. Thus, averages of two runs, without extraction, indicate an average efficiency of 10.0 at 0 p.s.i.g. ethylene pressure and 7.8 at 5½ p.s.i.g., while individual nonextraction runs show an efficiency ratio of 9.8 at 25 p.s.i.g. ethylene pressure and 7.2 at 65 p.s.i.g. In this case the initial efficiency ratios may be relatively high because the runs were made in glass apparatus.

Examples 5 through 10 involve the use octene-1, heptene-3 and a mixture of octene-1 and heptene-3 as the olefinic reactant. The data and results are summarized in Table II.

a small (about 20%) additional increase in the efficiency ratio is obtained.

Example 7 is similar to Example 6 with the exception that the incremental addition of the peroxide was at a slower rate and a somewhat higher temperature was used; also, about 25 times as much sodium acetate was present, and silver acetate was also added as a catalyst for the persulfate oxidation of the acetic acid. This resulted in a very substantial and unobvious increase in efficiency ratio (from 1.72 to 4.45), being about equal to that of acetyl peroxide under the best conditions for each.

Example 8 shows the results of a run made with an equimolar mixture of octene-1 and heptene-3, and Example 9 using heptene-3 alone. The initiator was acetyl peroxide, which was introduced by batch-addition technique, and the solvent was acetic acid. The ratio of products of Example 8 indicates that about 6 times as much terminal olefin was converted to acid as was the internal olefin. However, the efficiency ratio was appreciably lowered. A similarly low efficiency ratio was noted in the results of the run of Example 9.

TABLE II

| Example No. | 5 | 6 | 7 | 8 | 9 | 10 |
|---|---|---|---|---|---|---|
| Olefin | Octene-1 | Octene-1 | Octene-1 | {Octene-1, Heptene-3} | Heptene-3 | Octene-1 |
| Olefin concentration, M | 0.096 | 0.096 | 0.096 | {0.048, 0.048} | 0.096 | 0.096 |
| $Ac_2O$, vol. percent | | | | 5 | 5 | 5 |
| Solvent | 65% HOAc, 35% $H_2O$ | 65% HOAc, 35% $H_2O$ | 65% HOAc, 35% $H_2O$ | HOAc | HOAc | HOAc |
| Peroxide | $K_2S_2O_8$ | $K_2S_2O_8$ | $K_2S_2O_8$ | $Ac_2O_2$ | $Ac_2O_2$ | $Ac_2O_2$ |
| Peroxide addition rate | (a) | (b) | (c) | (a) | (a) | (d) |
| Peroxide, millimoles | 1.1 | 1.11 | 1.11 | 1.11 | 1.15 | 2.28 |
| Temperature, °C | 80 | 90 | 94-103 | 90 | 90 | 118 |
| Run duration, hrs | >5 | >8 | >6 | >5 | >5 | >7 |
| Acid produced | Capric | Capric | Capric | Capric and Nonanoic | Capric and Nonanoic | Capric |
| Acid, millimoles per millimole peroxide decomposed | 0.66 | 1.72 | 4.45 | 0.8 | 0.72 | 5.05 | a Batch addition.
b The peroxide (6.1 ml. aqueous solution) was added 1 ml. to start and then ½ ml. each 15 min. The temperature was maintained for 2 hrs. after the completion of addition.
c The peroxide (6.1 ml. aqueous solution) was added ½ ml. to start and then ¼ ml. each 15 min. The temperature was maintained for 1 hr. after the completion of addition.
d The peroxide solution (10 ml.) was added ½ ml. to start and then ¼ ml. each 7½ min. The temperature was maintained for 1 hr. after the completion of addition.

The runs of the examples shown in Table II were made by mixing all the reactants (200 ml. volume) except the peroxide initiator in a 3-necked, 500 ml., stirred flask fitted with a thermowell and a reflux condenser. Nitrogen, which had been scrubbed with pyrogallol solution, was continuously sparged into the system. In those runs where the peroxide was added batchwise, it was added before the heating was started. The reaction mass was then rapidly brought to reaction temperature and maintained there for at least five half-lives of the peroxide. In the other runs, the peroxide was added in accordance with the schedules given in the footnotes. In Examples 5 and 6 sodium acetate (2.7 milliequivalents) was also added to neutralize the acid formed by persulfate decomposition. In Example 7 the reaction solution also contained 74 millimoles of sodium acetate and 0.7 millimole of silver acetate. The runs made with potassium persulfate were worked-up by extracting the organic products with ether. The ether solution was then analyzed by gas chromatography.

Examples 5 and 6 show how, when the initiator, potassium persulfate, is added in increments (Example 6) as compared with introducing it all at once with the initial ingredients ("batch addition"), the reaction temperature can be increased from 80° C. (Example 5) to 90° C. without a consequent increase in free-radical concentration. These changes resulted in a significant improvement in efficiency ratio, viz., from 0.66 to 1.72 millimoles acid produced per millimole peroxide decomposed. When the temperature is again increased (to 98° C., the boiling point of the reaction mass) and the rate of incremental addition of the peroxide further reduced, The run of Example 10 was made with octene-1, and the peroxide initiator was added in increments instead of batchwise. The latter technique permitted the use of a higher reaction temperature (118° C. vs. 90° C. for each of Examples 8 and 9). Otherwise the ingredients and procedure were much the same as for Examples 8 and 9. The efficiency ratio was 5.05, which was the highest of any of the runs of the examples of Table II.

Plotting a graph of the effect of product concentration on the peroxide efficiency ratio, based on the results of the foregoing examples and others, shows that this efficiency ratio drops off rapidly after the concentration of organic acid products reaches about 1½ percent. In other words, the concentration of organic acid product such as capric acid can be allowed to build up to at least 1½ percent before objectionable deleterious effects are observed.

Example 11

Repeating the runs of Examples 5 and 6 using a reaction mixture that additionally includes 30 ml. of n-decane, as an organic extractant to remove organic reaction products (including capric acid) as they are formed, increases the efficiency ratio over that obtained in Examples 5 and 6.

Examples 12 through 19 involve the use of pentene-1 as the olefinic reactant. The data and results are summarized in Table III.

have been expected if the acetic acid used had been sufficiently pure.

TABLE III

| Run Number | 12 | 13 | 14 | 15 | 16 | 17 | 18 | 19 |
|---|---|---|---|---|---|---|---|---|
| Pentene Concentration, M | 0.23 | 0.23 | 0.46 | 0.23 | 0.091 | 0.091 | 0.091 | 0.091 |
| $Ac_2O$, Vol. percent | 0 | 5 | 5 | 5 | 5 | 5 | 5 | 0 |
| Solvent | HOAc | HOAc | HOAc | HOAc | HOAc | HOAc | HOAc | {60% HOAc / 40% $H_2O$} |
| Solution, ml.[a] | 200 | 200 | 200 | 200 | 200 | 200 | 200 | 200 |
| Peroxide | $Ac_2O$ | $Ac_2O$ | $Ac_2O$ | $Ac_2O$ | $Ac_2O$ | $Ac_2O$ | $Ac_2O$ | $K_2S_2O_8$ |
| Peroxide, millimoles | 1.14 | 1.14 | 1.14 | 2.29 | 1.14 | 0.57 | 1.14 | 1.13 |
| Temperature, °C | 90 | 90 | 90 | 90 | 90 | 90 | 100 | 80 |
| Run duration, hrs | >5 | >5 | >5 | >5 | >5 | >5 | >5 | >5 |
| Sweep | (b) | (b) | (b) | (b) | (b) | (b) | (b) | (b) |
| Heptanoic acid, millimoles/millimole peroxide decomposed | 2.4 | 3.1 | 1.91 | 2.46 | 4.05 | 4.00 | 5.13 | 0.31 |
| Remarks | | | | | | | (c) | (d) |

[a] This represents the total volume of all ingredients.
[b] In these runs, nitrogen was scrubbed with pyrogallol and bubbled through the solution before and during the runs. All the extraneous peaks previously observed practically disappeared.
[c] This run was made at 100° C. The peroxide was dissolved in 10 ml. of acetic acid. Two ml. was added at the start of the reaction and 1 ml. every 15 minutes thereafter.
[d] Sodium acetate was added to neutralize the acidity formed by the decomposition of potassium persulfate.

The runs of the examples shown in Table III (except the run of Example 18) were made by premixing all the ingredients, including the peroxide, in a reaction vessel of the kind previously described with reference to the examples of Table II. The system was then swept at room temperature by nitrogen that had been bubbled through pyrogallol solution in a gas-washing bottle. The deoxygenated nitrogen was fed through a sintered glass sparge below the liquid surface in the vessel. After sweeping for 20 minutes, the contents were heated to the reaction temperature.

Example 19 is a run using a water-soluble persulfate, specifically potassium persulfate, as the initiator. Since this salt is not appreciably soluble in acetic acid, a 60% acetic acid-40% water solvent was used. The run was carried out the same as the others using a nitrogen sweep. The product was worked up by diluting the product solution with an equal amount of water (200 ml.) and extracting with 10 ml. of cyclohexane. The cyclohexane solution was analyzed by gas chromatography.

The products of the other examples were worked up by distilling the product solution through a short Vigreux column at atmospheric pressure until about 10 ml. of residue remained. The residue was then analyzed by gas chromatography.

The runs of Example 12 through 18 were made with acetyl peroxide as the initiator. A dehydrating agent, specifically 5 volume percent of acetic anhydride, additionally was used in each of the runs of Examples 13 through 18 in order to maintain anhydrous conditions during the course of the run. A comparison of the efficiency ratios of Example 12 and 13 shows the significant improvement in peroxide efficiency (increased from 2.4 to 3.1) obtained when a dehydrating agent is used in conjunction with an acyl peroxide initiator.

The run of Example 14, which was a repeat of that of Example 13 but with double the pentene concentration, resulted in a reduction of the peroxide efficiency from 3.1 to 1.91.

When the petene concentration was maintained the same but the peroxide concentration was doubled (compare Examples 13 and 15), the peroxide efficiency was reduced from 3.1 to 2.46.

The Example 16 run was a repeat of that of Example 13 except that the pentene concentration was reduced from 0.23 M to 0.091 M. The peroxide efficiency was significantly increased from 3.1 to 4.05.

The run of Example 17 was a repeat of that of Example 16 at one-half the peroxide concentration. The peroxide efficiency was about the same. Based on the results of similar work with ethylene as the olefin, an increase would The Example 18 run was similar to that of Example 17 except for the manner of adding the peroxide and the temperature being maintained at 100° C. instead of 90° C. In order to counteract the increase in free-radical concentration arising from batchwise addition of the initiator, it was added in small increments over a period of about 2½ hours. This technique resulted in over 25% increase in the peroxide efficiency, more particularly from 4.05 to 5.13.

Example 20

Repeating the run of Example 19 using a reaction mixture that additionally includes 30 ml. of n-nonane, as an extractant to remove organic reaction products (including heptanoic acid) as they are formed, increases the efficiency ratio substantially above the 0.31 efficiency ratio obtained in Example 19.

Instead of acetyl peroxide as in Example 8 through 10 and 12 through 18, one may use any other free-radical initiator, more particularly peroxy compounds such as the various organic peroxides. Illustrative examples of such initiators are the various symmetrical diacyl peroxides other than acetyl peroxide (diacetyl peroxide), e.g., those commonly known as propionyl peroxide, lauroyl peroxide, succinyl peroxide, butyrl peroxide, capryl peroxide, etc.; unsymmetrical or mixed diacyl peroxides, e.g.; acetyl propionyl peroxide, acetyl butyryl peroxide, acetyl capryol peroxide, etc.; the various dialkyl peroxides, e.g., the ethyl, propyl, lauryl, stearyl, tert.-butyl and tert.-amyl peroxides; and others that will be apparent to those skilled in the art from the foregoing illustrative examples.

Instead of sodium or potassium persulfates as in Examples 1–4 (sodium persulfate initiator), 5–7, 11, 19 and 20 (potassium persulfate initiator), one may use any other water-soluble initiator such as hydrogen peroxide, ammonium persulfate, any of the other alkali-metal persulfates, or the sodium, potassium or any of the other alkali-metal or the ammonium perphosphates, perborates, percarbonates or other water-soluble persalts or derivatives thereof.

The temperature, time and other conditions of reaction are of course modified, as and when necessary, to obtain optimum efficiency from the particular initiator employed.

The method of the present invention is very well adaptable to continuous operation. Such a continuous method optionally may include means for the continuous electrolytic regeneration of initiator. In this way the cost of the initiator is materially decreased since the electrolysis of, for example, sodium sulfate to sodium persulfate is a well-developed procedure.

The reactor is a simple stirred vessel which can be operated under pressure. In operation it contains two immiscible phases which are stirred rapidly at their interface to provide a central mixing zone to which the olefin, e.g., ethylene, is fed. The lighter organic phase separates in a zone above the mixing zone while the heavier aqueous phase separates in a zone below the mixing zone. The organic phase, which contains extractant and reaction products, is withdrawn through a line leading from the upper zone of the reactor to a fractionating column where the lower-boiling extractant, e.g., a $C_5$–$C_7$ alkane, is removed as an overhead stream and recycled to the mixing zone of the reactor through a line leading thereto. The higher-boiling reaction products are taken off as a base stream through a line leading from a point near the bottom of the fractionating column, and are further worked-up, e.g., by fractionation, purification, decolorization, etc.

The aqueous phase is withdrawn through a line leading from the lower zone of the reactor to a distillation column where an overhead stream of organic acid, e.g., butyric acid-water azeotrope is removed for further processing. When the chain-transfer agent is acetic acid, the base stream of this column is an aqueous acetic acid solution of a salt, specifically sodium sulfate or sodium bisulfate when the initiator is, for example, sodium persulfate. If this salt solution is converted directly, e.g., electrolytically, to a solution of sodium persulfate without undue attack on the acetic acid, the regenerated salt solution is recycled to the central mixing zone of the reactor.

The system is started by, for example, charging the reactor with the desired amounts of alkane extractant, ethylene (or other olefin) and a chain-transfer agent, e.g., 50% aqueous acetic acid containing sodium sulfate or sodium bisulfate. The extractant distillation tower is set so that it will not take any product stream until the base temperature has risen to a point which indicates that no extractant is in the base. Any necessary makeup of extractant may be added to the aforementioned line for recycling recovered extractant to the extraction zone.

The distillation column that receives the aqueous phase from the lower zone of the reactor is adjusted so that it will not deliver any overhead until the temperature has dropped, when the olefin is ethylene, to that of the butyric acid-water azeotrope. Any make up water-acetic acid required during startup or that which would be required during operation may be added to, for example, a middle tray of the column for azeotropic distillation (to prevent salt precipitation therein), to the line leading from the bottom of this column to the electrolytic cell for regeneration of initiator, or to the line that carries the regenerated salt solution to the mixing zone of reactor.

The process is started by sending current through the electrolytic cell when this optional unit is a part of the equipment and operation. The presence of sodium sulfate or sodium bisulfate in the cell is a function of pH. When sodium persulfate decomposes, sodium bisulfate is generated:

(XI) 
$Na_2S_2O_8 + 2HOAc \rightarrow 2NaHSO_4 + 2AcO$

If sodium acetate is present:

(XII) 
$NaHSO_4 + NaOAc \rightarrow Na_2SO_4 + HOAc$

The reaction can be efficiently carried out under either acid or neutral conditions. On the acid side, however, it is desirable to have a silver catalyst, e.g., silver acetate, present. No sodium acetate is required when the reaction is effected on the acid side.

Alternatively, the required amount of persulfate may be continuously added to a line leading to the mixing zone of the reactor while the sodium bisulfate concentration is allowed to approach its limit. The precipitated bisulfate may then be filtered from the stream leading from the lower part of the azeotropic distillation column, and regenerated in a separate electrolytic cell in known manner. This regenerated salt is then the source of the initiator that is fed into the line leading to the mixing zone of the reactor.

Another alternative is to neutralize the sodium bisulfate with either sodium hydroxide or sodium acetate. On cooling the lower discharge stream from the azeotropic distillation column, the $Na_2SO_4$ forms the less-soluble Glauber's salt ($Na_2SO_4 \cdot 10H_2O$) which can be separated by filtration or otherwise, and regenerated to sodium persulfate. This system requires the consumption of two moles of NaOH per mole of persulfate decomposed, which is the same amount that is formed in the electrolytic regeneration cell.

When the olefin, e.g., ethylene, contains any inert organic compounds, the reactor is provided with a purge valve that will permit periodic blowdowns.

It will be understood, of course, by those skilled in the art that the present invention is not limited to the use of the specific ingredients, proportions thereof, time, temperature, pressure and other conditions of reaction, modifications, etc., that are given in the foregoing detailed description and examples by way of illustration. Thus, instead of the particular olefins, chain-transfer agents, initiators, extractants, etc., used in the illustrative examples, one may employ any of the other aforesaid ingredients mentioned hereinbefore by way of illustration. Such ingredients may be used in the proportions and in the manner stated in parts of this specification other than in the specific examples.

The embodiments of the invention in which an exclusive property or privilege is claimed are defined as follows.

We claim:
1. The method which comprises:
   (A) effecting reaction between an olefin and a saturated aliphatic monocarboxylic acid which is at least partly water soluble, said reaction being effected in an aqueous liquid phase reaction medium containing a water-soluble initiator of reaction between said reactants; and
   (B) improving the efficiency ratio of the aforesaid initiator by extracting organic product of reaction from said aqueous reaction medium with a liquid extractant as and when said products are formed in said reaction medium, said initiator being more soluble in said reaction medium than in said liquid extractant, said extractant being a liquid which is not completely miscible with said reaction medium and which is selected from the group consisting of said olefin itself, alkanes which are free of tertiary hydrogen atoms, and dialkyl ethers which are free of tertiary hydrogen atoms.

2. A method as in claim 1, wherein the olefin is ethylene.
3. A method as in claim 1, wherein the olefin is pentene-1.
4. A method as in claim 1, wherein the olefin is octene-1.
5. A method as in claim 1, wherein the saturated aliphatic monocarboxylic acid is acetic acid.
6. A method as in claim 1, wherein the olefin is ethylene and the reactive organic compound is acetic acid.
7. The method which comprises:
   (A) effecting a transaddition reaction between a straight-chain, terminally unsaturated olefinic compound and a saturated aliphatic monocarboxylic acid which is at least partly water soluble, said reaction being effected in an aqueous, liquid reaction medium containing a water-soluble initiator of a transaddition reaction between said reactants; and
   (B) extracting organic products of the reaction from said aqueous medium, as and when they are formed in said medium, with a liquid solvent for said organic reaction products, said solvent being a liquid which is not completely miscible with the reaction medium and which is selected from the group consisting of said olefinic compound itself, alkanes which are free of tertiary hydrogen atoms, and dialkyl ethers which are free of tertiary hydrogen atoms, said water-soluble initiator being more soluble in said aqueous, liquid reaction medium than in said solvent.

8. A method as in claim 7, wherein the water-soluble initiator is a water-soluble persulfate.

9. A method as in claim 7, wherein the water-soluble initiator is an alkali-metal persulfate and the solvent is a liquid, straight-chain alkane.

10. A method as in claim 7, wherein only a small amount of the water-soluble initiator is added at the start of the reaction and the remaining larger amount is added throughout the course of the reaction thereby permitting an increase in the reaction temperature at which said initiator can be most effectively used, with resulting increase in the efficiency ratio of the said initiator.

References Cited
UNITED STATES PATENTS 3,282,832  11/1966  Hey et al. _____ 260—537

LORRAINE A. WEINBERGER, Primary Examiner

D. STENZEL, Assistant Examiner

U.S. Cl. X.R.

260—465.3, 465.8, 485, 491, 533, 537, 561, 614, 642

UNITED STATES PATENT OFFICE
CERTIFICATE OF CORRECTION

Patent No. 3,470,219                                              September 30, 1969

Charles C. Hobbs, Jr., et al.

It is certified that error appears in the above identified
patent and that said Letters Patent are hereby corrected as
shown below:

Column 9, TABLE I, second column, line 10 thereof, "9.0215' should read -- 0.0215 --; same column, line 16 thereof, "9.021" should read -- 0.021 --. Columns 11 and 12, TABLE II, second column, line 6 thereof, "1.1" should read -- 1.11 --; same TABLE II, fifth column, line 9 thereof, "1.11" should read -- 1.15 --; same TABLE II, seventh column, line 7 thereof, "2.28" should read -- 1.18 --.

Signed and sealed this 2nd day of March 1971.

(SEAL)
Attest:

Edward M. Fletcher, Jr.　　　　　　　　　　　　WILLIAM E. SCHUYLER, JR.
Attesting Officer　　　　　　　　　　　　　　　　Commissioner of Patents